United States Patent [19]
Brülhardt et al.

[11] Patent Number: 5,739,669
[45] Date of Patent: Apr. 14, 1998

[54] ELECTRIC BATTERY MANAGEMENT DEVICE

[75] Inventors: Marcel Brülhardt, Cudrefin; Christian Terrier, Corcelles, both of Switzerland

[73] Assignee: EM Microelectronic-Marin SA, Marin, Switzerland

[21] Appl. No.: 721,850

[22] Filed: Sep. 30, 1996

[30] Foreign Application Priority Data

Oct. 24, 1995 [FR] France ................... 95 12519

[51] Int. Cl.[6] ................................................ H02J 7/00
[52] U.S. Cl. ....................... 320/6; 320/17; 320/2; 320/15; 320/5
[58] Field of Search ............................. 320/6, 15, 17, 320/18, 5, 2, 48

[56] References Cited

U.S. PATENT DOCUMENTS

| | | |
|---|---|---|
| 4,238,721 | 12/1980 | DeLuca et al. |
| 4,280,097 | 7/1981 | Carey et al. ............... 320/48 |
| 4,484,130 | 11/1984 | Lowndes et al. ........... 320/17 |
| 5,150,031 | 9/1992 | James et al. ............... 320/2 |
| 5,206,097 | 4/1993 | Burns et al. ............... 320/48 X |
| 5,371,453 | 12/1994 | Fernandez ................. 320/5 |
| 5,469,042 | 11/1995 | Ruhling ..................... 320/17 |
| 5,498,950 | 3/1996 | Ouwerkerk ................ 320/18 |
| 5,504,415 | 4/1996 | Podrahnsky et al. ...... 320/18 |

FOREIGN PATENT DOCUMENTS

| | | |
|---|---|---|
| 3411234 | 9/1985 | Germany . |
| 4408740 | 7/1995 | Germany . |
| 2049365 | 12/1980 | United Kingdom ........ H04J 6/00 |
| WO9310466 | 5/1993 | WIPO . |
| WO 95/15023 | 6/1995 | WIPO ....................... H02J 7/00 |
| WO9515023 | 6/1995 | WIPO . |

*Primary Examiner*—Robert Nappi
*Assistant Examiner*—K. Shin
*Attorney, Agent, or Firm*—Sughrue, Mion, Zinn, Macpeak & Seas, PLLC

[57] ABSTRACT

The device 1 for the management of a plurality electric battery elements 2 connected in series, comprises a plurality of battery management modules 4, each management module being connected in parallel to the terminals of a respective battery element 2 and supplied by its output voltage, the management modules 4 including a digital circuit 11 and being connected in series by at least a digital liaison 9, 9' so as to exchange binary information between said digital circuit 11 and a control unit 5 of the battery, and is characterized in that at least a capacitor 8, 8' is connected in series on said digital liaison 9, 9' so that the binary information may be exchanged between each management module 4 and the unit control 5, independently of the electric potentials at the terminals of the battery elements 2.

10 Claims, 3 Drawing Sheets

ELECTRIC BATTERY MANAGEMENT DEVICE

BACKGROUND OF THE INVENTION

The present invention concerns an electric battery management device.

The invention applies in particular to the management of batteries supplying an electric motor, but also applies generally to all systems using a plurality of batteries connected in series.

In devices of this type, several batteries, for example batteries having a 24 V output voltage, a reconnected in series, in order to obtain a higher voltage corresponding to the supply voltage of an electric motor. A battery management module is connected to the terminals of each battery in order to monitor a number of parameters concerning the state of the battery and its temporal evolution, such as, for example, the temperature and the voltage of the battery.

The management modules are connected in series, one of the modules also being connected to a control unit, including typically a logical circuit and/or a microprocessor.

In this context, one of the problems of managing the state of the group of connected batteries resides in the communication between the different battery management modules and the control unit, given that a galvanic (electrical) isolation must exist between the output voltage of the battery elements, this being a high voltage which is, for example, in the order of 24 Volts and which may include parasitic voltages, and the output voltage of the digital circuits of the management modules and of the control unit, which is a DC voltage having a lower amplitude, for example in the order 5 Volts, and which must be exempt from parasitic voltage spikes.

According to a known embodiment in the state of the art, each management module associated with a battery is composed of two galvanically (electrically) separated parts, for example a first part including electronic circuits for measuring the parameters of voltage and of temperature of the battery and an analog-digital converter of these measurements, and a second part galvanically isolated from the first, which receives the digital data corresponding to the measurements, the data from each module being thus transmitted by a bus to a calculator. The galvanic isolation is realised by isolation couplers, for example photocouplers or inductive couplers, enabling the exchange with the battery control circuit of information concerning the state of the battery, and information for controlling the current charge and of the current drawn. The galvanic isolation thus obtained between each management module and the battery associated with it is certainly satisfactory in many circumstances, but the cost and the complexity of such a device is disadvantaged by fact that each management module uses two electronic chips, connected to each other by an isolation coupler.

SUMMARY OF THE INVENTION

An aim the present invention is to overcome or ameliorate these inconveniences, and to propose a battery management device having a structure which is simpler and less expensive, whilst preserving the galvanic isolation between the output voltage of the batteries and the power supply of the battery management modules and the control unit.

Another aim the invention is to propose a battery management device in which each management module includes only a single chip, supplied by the battery.

Another aim of the invention is to propose a battery management device enabling the control of the group of battery management modules from a single control unit directly connected to a single battery element control module.

To this effect, the object of the invention is a management device of a plurality of electric battery elements connected in series, comprising a plurality of battery management modules, each management module being connected in parallel to the terminals of a respective battery element and driven by its output voltage, the management modules including a digital circuit and being connected in series by at least a digital liaison so as to able to exchange binary information between said digital circuit and a battery control unit, characterized in that at least a capacitor is connected in series on said digital liaison between two successive management modules such that the binary information exchanged between each management module and the control unit is independent of the DC electric potentials at the terminals of the battery elements.

According to other characteristics of the invention:

- the digital circuit includes a clock input and a data input/output, said digital liaison including a clock line connecting the clock inputs of the successive management modules to the clock output of the control unit through first capacitors, and a data line connecting in series the data input/output of successive management modules to the data input/output of the control unit through second capacitors such that the clock and data information propogate from one module to a respective adjacent module through said first and second capacitors, independently of the potential of the power supply terminals of each module.
- the digital circuit includes an analog-digital converter receiving at its input a clock signal and a data signal representative of a control signal from the control unit, and supplying at its output an analog signal able to control an operational parameter of the associated battery element.
- the digital circuit includes an address decoding circuit for decoding, from the data signal, the address of the management module to which the control signal from the control unit is intended.
- the operational of parameter being constituted by the temperature of a battery element, the management module includes control means adapted to regulate the temperature of the module as a function of the received command signal.
- the operational parameter being constituted by the output voltage of the battery element, the management module includes control means adapted to regulate the output voltage.
- the operational parameter being constituted by the output current of the battery element, the management module includes control means adapted to regulate the output current.
- the capacitors have a capacity in the order of 4.7 to 10 nanofarad.
- an amplifier is connected in series between the capacitors of two adjacent management modules.

The objects and characteristics of the invention will be described in more detail, and as a non-limitative example only, in relation to the drawings, in which:

BRIEF DESCRIPTION OF THE DRAWINGS

The FIG. 1 is a schematic diagram of the battery management device according to the invention, including a plurality of management modules connected in series.

DESCRIPTION OF A PREFERRED EMBODIMENT

Figure 1:
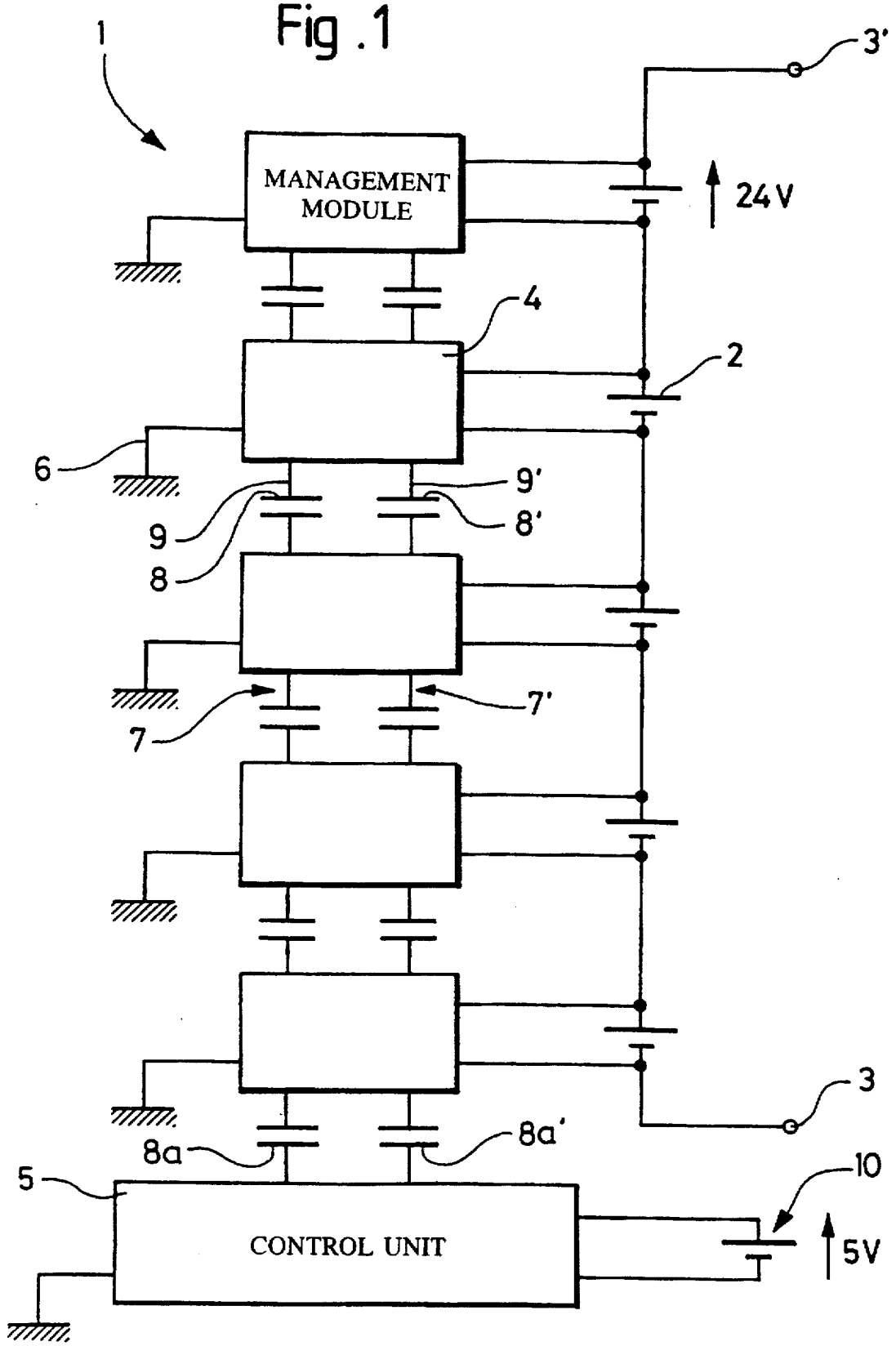

Referring to FIG. 1, there is represented a device 1 for the management of an electric battery composed by the connection in series of a plurality of electric battery elements 2 such that the battery produces at its terminals 3, 3' a certain DC electric voltage used to supply an electro mechanical device such as an electric motor (not represented).

To the terminals of each battery element 2 is connected a management module 4 of this battery element. Each management module 4 includes an electronic circuit which will be described further on, intended to measure certain operational parameters of the battery element 2, and to regulate the current drawn from this element or the voltage at its terminals in order to regulate the overall operation of the battery. To this effect, it is necessary that the operation of all the management modules 4 be coordinated by a control unit 5, which takes count of the operation parameters of all the battery elements so as to optimise the global operation of the battery. The processing algorithms of such a control unit 5 are known in themselves and have no particularly importance in the context of the present invention and, as such, will not be described here.

In order to be able to operate, each management module 4 draws its power supply from the terminals of the battery element 2 which it manages. As a consequence, the common point 6 of each management module has a different potential, substantially corresponding to the potential of one of the terminals of the corresponding battery element 2.

As the different management modules 4 must be connected in some manner to the control unit 5 by means of a digital liaison to exchange information therebetween for the reason explained hereabove, it is necessary, taking into account the typical potentials of such a device (for example multiples of 24 V at the terminals 3, 3' of the battery), to obtain a galvanic isolation between the different management modules 2 and each management module and the power supply 10 of the control unit 5, without requiring the complex and costly coupler means known from the state of the art.

To this effect, the invention enables the connection of the management modules 4 in the manner represented in FIG. 1. In this realisation, the management modules are connected in series on a digital liaison represented at 7, 7', each management module 2 being connected to adjacent modules by means of a capacitor 8, 8', and the last management module being connected to the control unit 5 in a similar manner, through capacitors 8a, 8a'.

In the example represented, the digital liaison thus obtained includes a first liaison line or bus 9 including first capacitor 8, and corresponding, for example, to a monodirectional transmission line or bus of a clock signal, and a second liaison line or bus 9' including a second capacitor 8' and corresponding, for example, to a bidirectional transmission bus or line of data signal pulses.

In the representative example, the lines 9 and 9' represented are single lines, the first and second capacitors 8, 8' associated therewith being thus unique. Capacitors having a capacitance in the order of 10 nF have been found to be suitable for this application.

The effect of capacitors 8, 8' consist of decoupling the various management modules 4 and the control unit 5 from each other with respect to the DC potentials, whilst enabling the passage of the data and clock binary signal pulses between the management modules and the control unit, the data and clock information propagating from one module to an adjacent module or to the control unit through the first and second capacitors 8, 8', independently of the DC supply potential of each management module 4.

An example of the realisation of the management module 4 will now be described in more detail, in relation with FIG. 2.

Each management module 4 includes a digital circuit 11 including various components or functions necessary for the management of the battery element 2. As an example, the digital circuit 11 integrates a bidirectional analog/digital converter (not represented), enabling, in a first direction, to digitize a physical operational parameter of the battery element 2 to enable its transmission to the control unit 5 by means of the bidirectional line 9', and to enable in a second direction, to transform a command from the control unit 5 into an analog control signal of a transistor 12 used to regulate the operation of the battery element 2. To this effect, the analog control signal is provided to the base 13 of the transistor 12 whose emitter 14 is connected to the terminal Vdd 15 of the battery element 2 through a resistance 16, and whose collector 17 is connected to the other terminal Vss 18 of the battery element. In this manner, the current through the transistor 11 is able to regulate the current of the battery element 2, as a function of the operational parameters thereof.

In order to know the operation of a battery element 2, there is used for example, in a continuous manner, it temperature and/or its output voltage. To this effect, one may use temperature detector circuits 19 or voltage measuring circuits 20, connected between the common point 6 of the management module and the corresponding input of the converter circuit 11, possibly through amplifiers 21 if the measured signal is too weak to be able to the directly transmitted to the circuit 11. Such circuits 19, 20 for the measurement of temperature and voltage are known to a skilled person and need not be further described here.

It is be noted that in the preferred case where the liaison between the management modules and the control unit is realised in the form of single lines 9, 9' and not by a bus, it will be necessary to provide means for multiplexing the information from each management module 4 on the data liaison 9' and to demultiplex the commands from the control unit 5 towards the different management modules 4. To this effect, the digital circuits 11 of each management module 4 are provided with address decoding circuits, for example in the form of pulse counters (not shown), each command message from the control unit being composed of a predetermined number of address pulses corresponding to a single management module 4, and control pulses the digital-analog conversion of each produces a control signal of the transistor 12.

Figure 2:
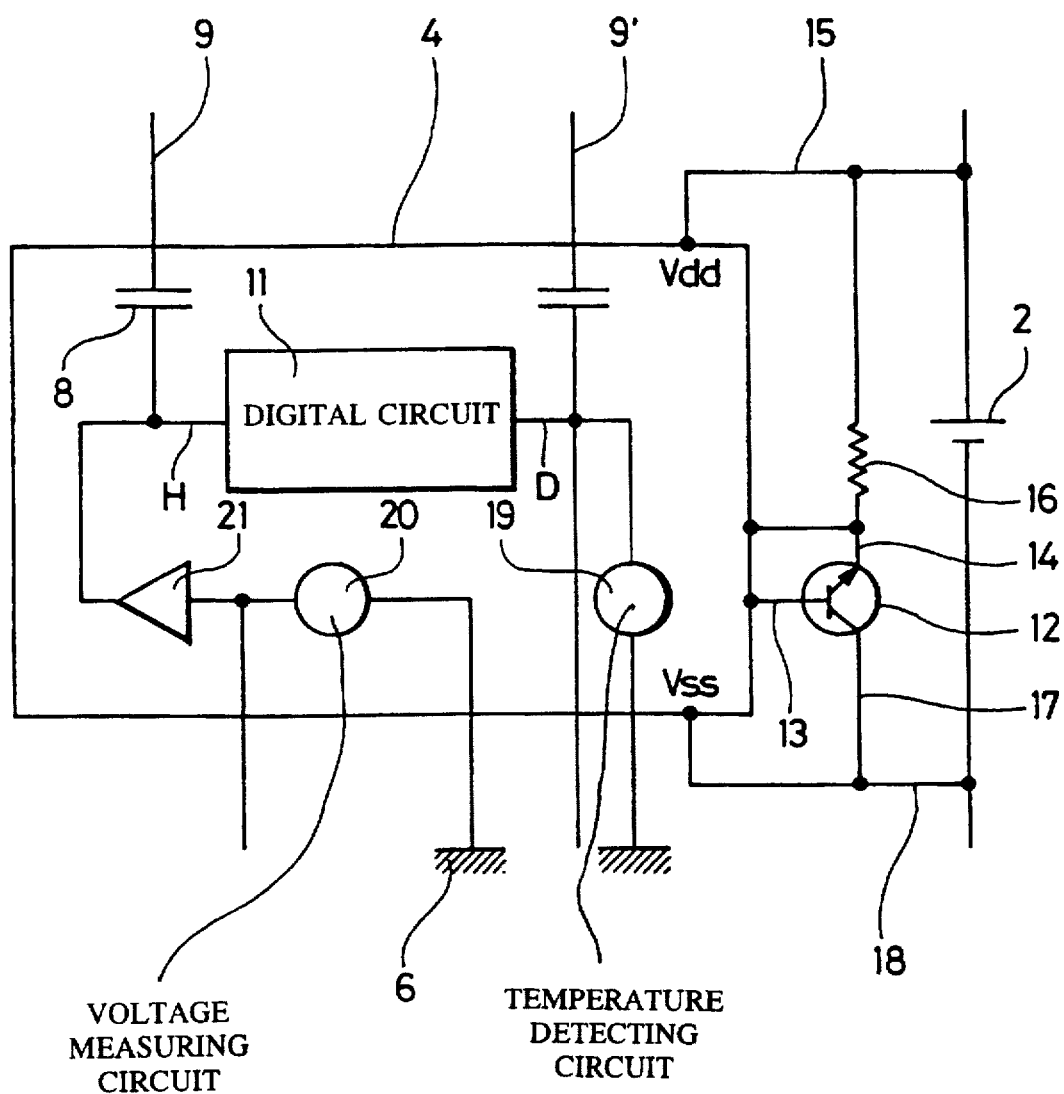
FIG. 2 is a enlarged schematic of an example of a module of the battery management device of FIG. 1.
Figure 3:
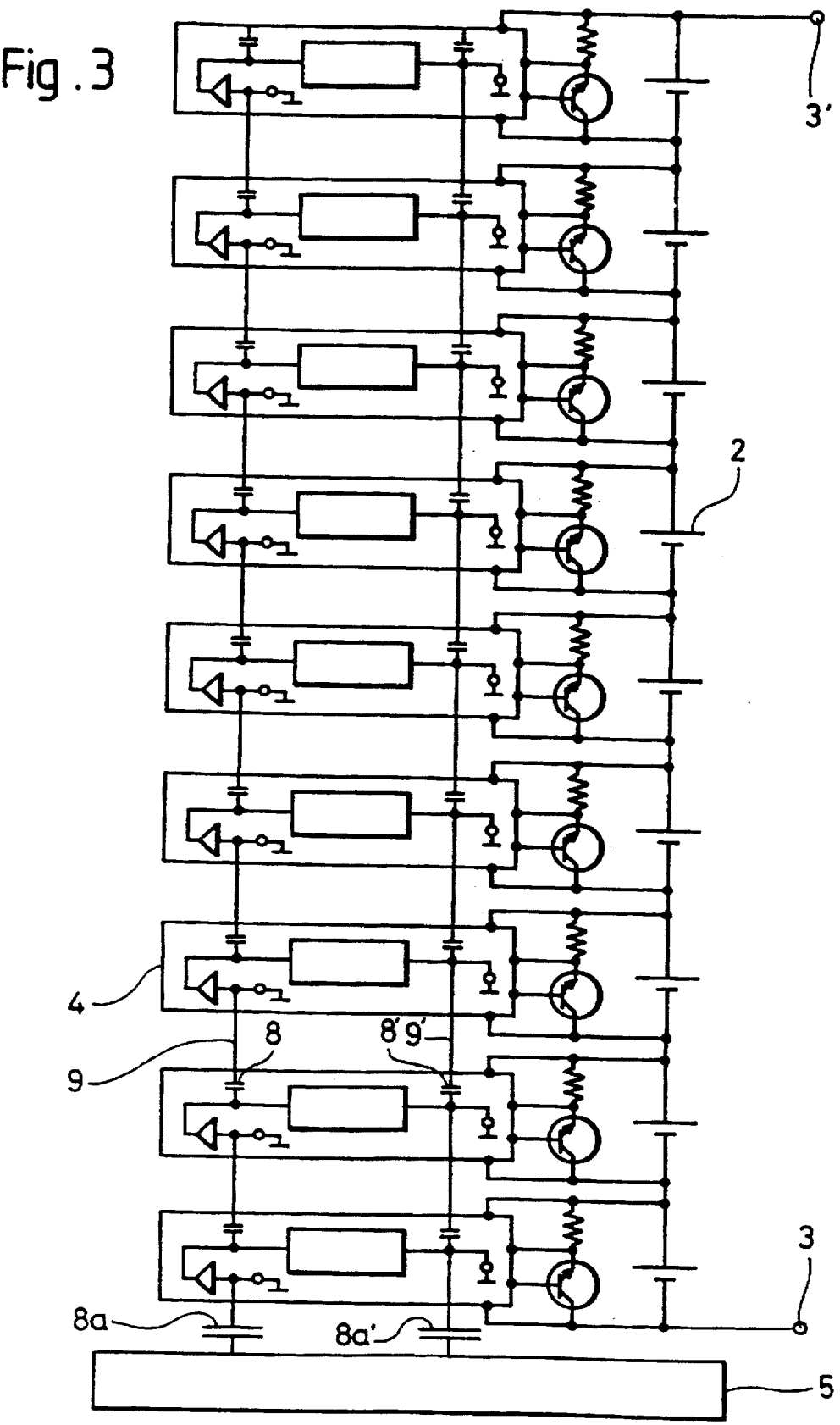
FIG. 3 is a schematic diagram of a more detailed realisation of the device of FIG. 1.

FIG. 3 is a combined view of FIGS. 1 and 2 showing in a more detailed manner the device 1. In this representation, the capacitors 8, 8' have been integrated into the management modules 4 corresponding thereto, such that it suffices to interconnect adjacent management modules 4 by means of their respective clock and data terminals.

From the preceding description, it is clear that the device perfectly fulfills the set objectives. In particular, the proposed structure is simple and modular and does not require costly components.

Moreover, due to the conception of the management modules of the device according to the invention, it is not necessary to convert the logic levels for adapting the data exchanged between the control unit and the modules to the different electric potentials which exist in the device, and notably in the case of successive 24 Vs in the described example. One single logic system suffices, and the clock and data pulses are communicated between the management modules of the battery and the control unit through capacitors, independently of the DC output voltage of the battery and of the modules, and without that requiring complex galvanic isolation devices.

What is claimed is:

1. A management device (1) for a plurality of electric battery elements (2) connected in series, comprising a plurality of battery management modules (4), each management module being connected in parallel to the terminals of a respective battery element (2) and supplied by its output voltage, the management modules (4) including a digital circuit (11) and being connected to a control unit (5) of the battery by at least a digital liaison (9, 9') so is to be able to exchange binary information between the digital circuits and the control unit of the battery, wherein said management modules (4) are connected in series by said digital liaison (9, 9'), and wherein electrical isolation between successive ones of said management modules in said digital liaison is provided by at least one capacitor connected in series in said digital liaison (9, 9') between adjacent ones of said successive management modules, such that the binary information may be exchanged between each management module (4) and the control unit (5) independently of the electric potentials at the terminals of the battery elements (2).

2. Management device (1) according to claim 1, wherein said digital circuit (11) includes a clock input (H) and a data input/output (D), and wherein said digital liaison (9, 9') includes: a clock line (9) connecting the clock inputs of successive management modules (4) to a clock output of the control unit (5) through first capacitors (8); and a data line (9') connecting the inputs/outputs of successive management modules to a data input/output of the control unit (5) through second capacitors (8') such that the clock and data information propagate from a management module (4) to an adjacent module through said first and second capacitors (8, 8') independently of the potential (Vdd, Vss) of the supply terminals of each module (4).

3. Management device (1) according to claim 1, wherein said digital circuit (11) includes a bidirectional analog-digital converter receiving at its input a clock signal and a data signal representative of a command from the control unit (5) and supplying at its output an analog signal adapted to control at least one operational of parameter of the associated battery element (2).

4. Management device (1) according to claim 2, wherein said digital circuit (11) includes and address decoding circuit for decoding from the data signal the address of the management module (4) to which the command from the control unit (4) is attended.

5. Management device (1) according to claim 3, wherein said operational parameter is constituted by the temperature of a battery element (2), this management module (4) including measurement means (19) of the temperature of the battery element, and control means (12) adapted to regulate the temperature of the battery element (2) as a function of the received command.

6. Management device (1) according to claim 3, wherein said operational parameter is constituted by the output voltage of the battery element (2), this management module (4) including measurement means (20) of the output voltage of the battery element (2), and control means (12) adapted to regulate said output voltage.

7. Management device (1) according to claim 3, wherein said operational parameter is constituted by the output current of the battery element (2), this management module (4) including measurement means (20) of the output current of the battery element (2) and control means (12) adapted to regulate said output current.

8. Management device (1) according to claims 5, 6 or 7, wherein said control means (12) includes a transistor (12) receiving at its base (13) a command for regulating said parameter, and whose collector (17) and emitter (14) are connected to the terminals of the battery element (12) through a resistor (16).

9. Management device (1) according to claim 1, wherein said capacitor (8, 8') has a capacitance in order of 4.7 to 10 nanofarad.

10. Management device (1) according to claim 5, 6 or 7, wherein an amplifier (21) is connected between the output of said measurement means (19, 20) and a data input of said converter (11).

* * * * *